June 25, 1940.  G. AGOSTINETO  2,205,379
KITCHEN TOOL
Filed Jan. 19, 1939  2 Sheets-Sheet 2
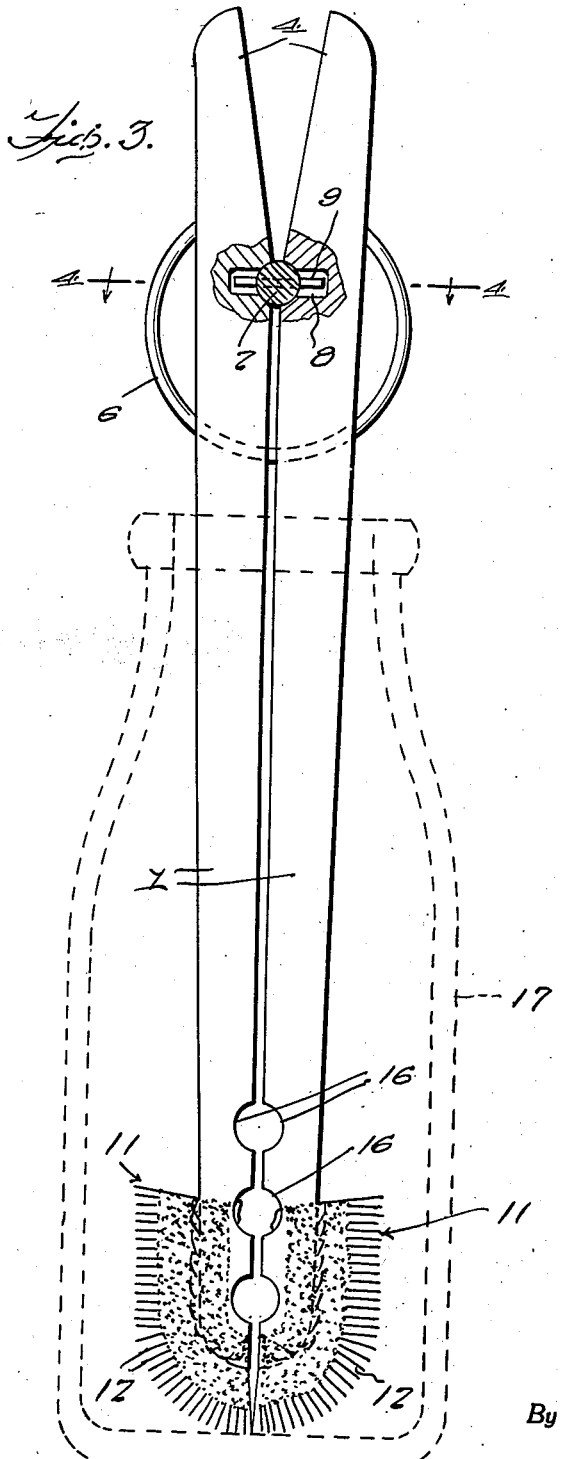
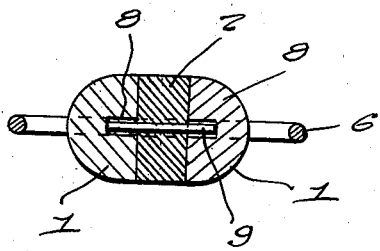
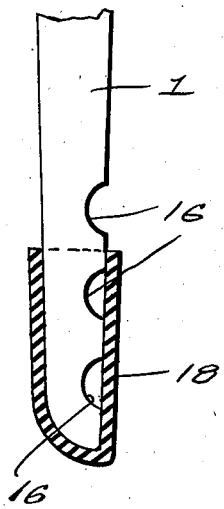
Inventor
G. Agostineto
By Clarence A. O'Brien
and Hyman Berman
Attorneys Patented June 25, 1940

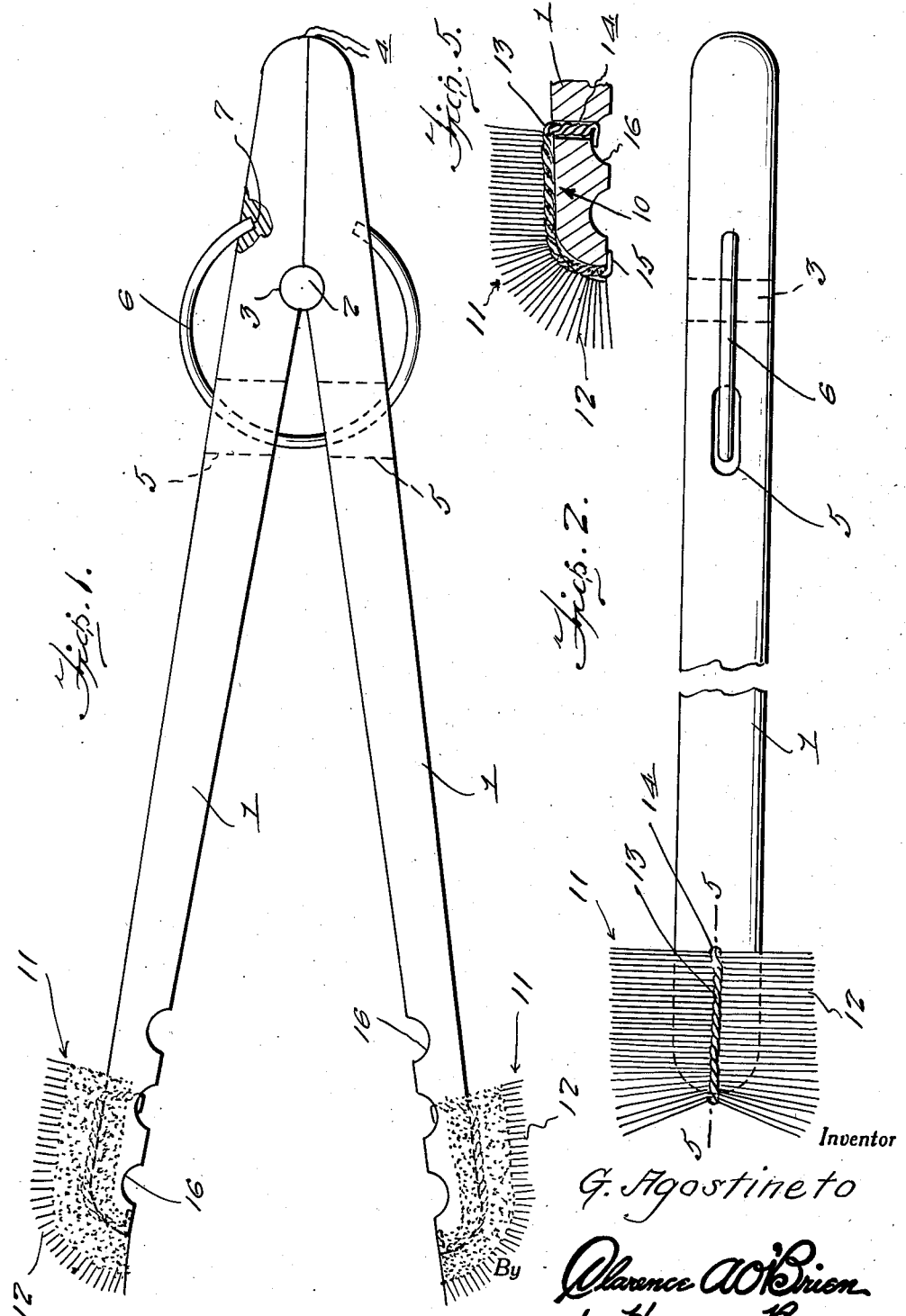

2,205,379

UNITED STATES PATENT OFFICE 2,205,379

KITCHEN TOOL

Giacomo Agostineto, Trout Creek, Mich., assignor of one-half to Thomas Roland Thompson, Trout Creek, Mich.

Application January 19, 1939, Serial No. 251,797

2 Claims. (Cl. 15—165)

The present invention relates to new and useful improvements in kitchen tools and has for its primary object to provide, in a manner as hereinafter set forth, a device of this character which is adapted to be used for a number of different purposes, such as for washing bottles and dishes, for removing clothes from hot water, etc.

Another very important object of the invention is to provide, in a kitchen tool of the type including a pair of pivotally connected legs, brushes mounted on said legs and comprising a construction and arrangement whereby said brushes may be expeditiously removed when desired.

Another very important object of the invention is to provide a tool of the aforementioned character embodying novel means for pivotally connecting the legs.

Other objects of the invention are to provide a combination kitchen tool of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a tool constructed in accordance with the present invention.

Figure 2 is a plan view thereof.

Figure 3 is an elevational view, showing the device inserted in a bottle to be cleaned, the pivotal connection of the legs being shown in section.

Figure 4 is a horizontal sectional view, taken substantially on the line 4—4 of Fig. 3.

Figure 5 is a view in longitudinal section, taken substantially on the line 5—5 of Fig. 2.

Figure 6 is a view showing, in vertical section, a rubber cot which may, if desired, be substituted for the brushes on the legs of the device.

Referring now to the drawings in detail, it will be seen that the reference numeral 1 designates a pair of duplicate legs of suitable material, preferably wood. The inner faces of the legs 1 are substantially flat. Mounted between the legs 1, adjacent one end thereof, is a fulcrum 2 on which said legs are adapted to swing. The legs 2 have formed therein opposed transverse grooves 3 which accommodate the fulcrum 2. Rearwardly of the fulcrum 2, the inner or opposed sides of the legs 1 are cut away or beveled, as at 4, in a manner to permit said legs to swing on said fulcrum 2 for opening or closing the tool.

Forwardly of the fulcrum 2, the legs 1 have formed longitudinally therein slots 5. The slots 5 accommodate a substantially C-shaped spring 6 having its end portions anchored in sockets 7 which are provided therefor in the legs 1 rearwardly of the fulcrum 2 for normally swinging the forward ends of said legs away from each other to open position. This is shown to advantage in Fig. 1 of the drawings. Also formed in the legs 1 are sockets 8 (see Fig. 3) which communicate with the grooves 3, said sockets 8 accommodating the projecting end portions of a pin 9 which is mounted in the fulcrum 2.

The forward end portions of the legs 1 are grooved, as at 10. Removably mounted on the forward end portions of the legs 1 are brushes which are designated generally by the reference numeral 11. The brushes 11 include bristles 12 which are mounted on twisted wire backs 13. One end portion of the twisted wires 13 extend through openings 14 which are provided therefor in the legs 1, in which said wires are anchored. The twisted wires 13 extend through the grooves 10 and terminate in hooks 15 at their forward ends which are engaged over the corresponding ends of the legs 1.

It will thus be seen that a tool has been provided wherein the brush members 11 may be expeditiously removed when desired. This may be accomplished by simply disengaging the hooks 15 from the inner faces of the legs 1 and then pulling the other end portions of the wires 15 out of the openings 14. The grooves 10 positively prevent lateral movement of the forward portions of the brushes 11 on the rounded forward ends of the legs 1 in addition to facilitating snapping the hooks 15 into position when mounting the brushes. The inner sides of the forward end portions of the legs 1 are transversely grooved, as at 16, to facilitate obtaining a good grip on an article that may be clamped between said legs. In Fig. 3 of the drawings, the device is shown inserted in a milk bottle 17. Of course, this is done by swinging the legs 1 together against the tension of the spring 6. After the tool is thus inserted in the bottle the legs 1 are released to permit them to be swung to open position by the spring 6 thereby engaging the brushes 11 with the walls of the bottle. When the device is to be used as a clothes tong the spring 6 is permitted to open or spread the legs 1 for the reception of the clothes therebetween. The pin 8 constitutes means for positively preventing displacement or loss of the fulcrum 2 between the legs 1. In Fig. 6 of the drawings, the reference numeral 18 designates a removable rubber cot which may be slipped on the forward end portion of each leg 1 in lieu of the brushes 11 for certain work.

It is believed that the many advantages of a kitchen tool constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A kitchen tool of the class described comprising a pair of duplicate legs having opposed transversely extending grooves therein, said grooves being of semi-circular shape in cross section and arranged adjacent one end of the legs, a fulcrum member of circular shape in cross section engaged in the grooves, the legs being journaled on said fulcrum, the legs further having slots therein, said fulcrum member being located between the slots and said ends of the legs, a substantially C-shaped spring passing through the slots and having its ends engaged with the legs between the fulcrum member and the said ends of the legs for opening said legs.

2. A tool of the class described comprising a pair of duplicate legs having opposed, transverse grooves therein and further having sockets therein communicating with the grooves, said grooves being each of semi-circular shape in cross section and arranged adjacent one end of the legs, a fulcrum member of circular shape in cross section engaged in the grooves, the legs being journalled on said fulcrum member for swinging movement to open and closed position, a pin mounted diametrically in the fulcrum member and projecting therefrom and engaged in the sockets, the legs further having longitudinal slots therein, a substantially C-shaped spring extending through the slots, having portions passing over the point of fulcrum of the legs and having its ends engaged with the legs between the point of fulcrum and said ends of the legs for yieldingly urging said legs toward open position.

GIACOMO AGOSTINETO.